US012680623B2

(12) United States Patent
Jones

(10) Patent No.: US 12,680,623 B2
(45) Date of Patent: Jul. 14, 2026

(54) CHECK VALVE HAVING A STATE INDICATION SYSTEM

(71) Applicant: THE BOEING COMPANY, Arlington, VA (US)

(72) Inventor: Amit Kenneth Tiwari Jones, Everett, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/888,304

(22) Filed: Sep. 18, 2024

(65) Prior Publication Data

US 2026/0078841 A1     Mar. 19, 2026

(51) Int. Cl.
F16K 37/00 (2006.01)
F16K 15/06 (2006.01)

(52) U.S. Cl.
CPC ........ F16K 37/0058 (2013.01); F16K 15/063 (2013.01)

(58) Field of Classification Search
CPC . F16K 37/0058; F16K 37/0016; F16K 15/063
See application file for complete search history.

(56) References Cited

U.S. PATENT DOCUMENTS 4,622,994 A * 11/1986 Rosaen ................. F16K 15/063
137/553
2021/0285567 A1* 9/2021 Kruppe, III ............. G01L 7/166

* cited by examiner

*Primary Examiner* — P. Macade Nichols
(74) *Attorney, Agent, or Firm* — Joseph M. Butscher; Carroll, Hoette & Butscher, LLC

(57) ABSTRACT

A check valve is configured to be disposed within a fluid path. The check valve includes a housing, a poppet retained within the housing, and a state indication system operatively coupled to the poppet. The state indication system is configured to provide an indication of a first operational state of the check valve, and a second operational state of the check valve.

20 Claims, 6 Drawing Sheets

CHECK VALVE HAVING A STATE INDICATION SYSTEM

FIELD OF THE DISCLOSURE

Examples of the present disclosure generally relate to a check valve, and more particularly to a check valve having a state indication system.

BACKGROUND OF THE DISCLOSURE

Various systems, components, devices, and the like include a check valve disposed within a fluid path. A check valve is configured to allow a fluid (such as a liquid or a gas) to flow therethrough in one direction.

Over time, a check valve may degrade and/or malfunction. However, known check valves are typically unable to provide a readily discernable indication of a potential malfunction.

SUMMARY OF THE DISCLOSURE

A need exists for a check valve that allows an observer to quickly and easily determine an operational state of the check valve. Further, a need exists for a system and a method for providing a readily discernable indication of an operational state of a check valve.

With those needs in mind, certain examples of the present disclosure provide a check valve configured to be disposed within a fluid path. The check valve includes a housing, a poppet retained within the housing, and a state indication system operatively coupled to the poppet. The state indication system is configured to provide an indication of a first operational state of the check valve, and a second operational state of the check valve.

In at least one example, the first operational state is a closed state of the check valve, and the second operational state is an open state of the check valve.

In at least one example, the poppet is retained within a passage of the housing. The poppet includes a head, and a stem extending from the head. The stem includes a main shaft connected to a cam surface. The cam surface connects to a groove.

In at least one example, a spring is connected to a spring-retaining foot of the poppet. As a further example, the check valve also include an end cap. The spring is disposed between the end cap and the spring-retaining foot.

In at least one example, the state indication system includes a body including a window. A plunger is biased into a portion of the poppet. The plunger includes one or more first indicators that indicate that the check valve is in the first state, and one or more second indicators that indicate that the check valve is in the second state. As a further example, the one or more first indicators show through the window to indicate that the check valve is in the first state, and the one or more second indicators show through the window to indicate that the check valve is in the second state. In at least one example, the one or more first indicators include an end of the plunger one of recessed within or extending outwardly from the body, and the one or more second indicators include the end of the plunger the other of recessed within or extending outwardly from the body. The one or more first indicators can include a first color, and the one or more second indicators can include a second color that differs from the first color.

In at least one example, the plunger further includes a bearing biased into the portion of the poppet. As a further example, the bearing is within the groove when the check valve is in the first state, and wherein the bearing is outside of the groove when the check valve is in the second state.

In at least one example, the stem also includes a protuberance proximate to the groove. A portion of the plunger is biased into the protuberance when the check valve is in the first state. The plunger is configured to be pressed to move in relation to the protuberance to provide an indication that the check valve is properly functioning.

One or more of a switch, a control unit, or a sensor can be in communication with the state indication system.

Certain examples of the present disclosure provide a method including providing, by the state indication system, an indication of a first operational state of the check valve; and providing, by the state indication system, an indication of a second operational state of the check valve.

Certain examples of the present disclosure provide a system including a fluid path, and a check valve disposed within a fluid path, as described herein.

DETAILED DESCRIPTION OF THE DISCLOSURE

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

A check valve includes a state indication system. In at least one example, the state indication system includes a transverse plunger, which is driven by motion of a poppet to indicate an operational state of the check valve (for example, open or closed). The state indication system includes a visual indicator configured to provide a readily discernable indication of a state of the check valve. As a further example, the check valve can also include driving mechanical or magnetic switches to electrically indicate the operational state.

Figure 1:
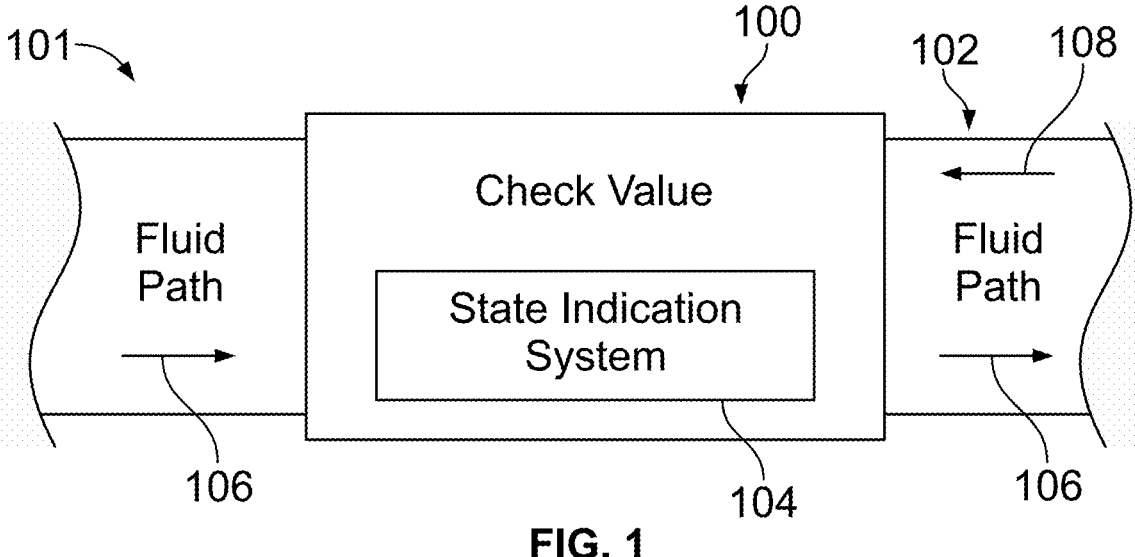
FIG. 1 illustrates a block diagram of a check valve within a fluid path, according to an example of the present disclosure.

FIG. 1 illustrates a block diagram of a check valve 100 within a fluid path 102, according to an example of the present disclosure. In at least one example, the fluid path 102 is a tube, pipe, conduit, plenum, or the like configured to allow fluid to flow therethrough. In at least one example, the fluid is a liquid, such a hydraulic fluid (for example, oil). As another example, the fluid is a gas, such as air. As shown, a system 101 includes the check valve 100 disposed within the fluid path 102.

The check valve 100 includes a state indication system 104, which is configured to provide a readily discernable indication of an operational state of the check valve. The state indication system 104 is configured to provide an indication of a first operational state and a second operational state of the check valve 100. The first operational state can be a closed state of the check valve 100, which can be associated with a properly functioning state. The second operational state can be an open state of the check valve 100, which can be associated with a malfunctioning state.

In operation, fluid flows through the fluid path 102 in the direction of arrow 106. When properly functioning, the check valve 100 is configured to allow the fluid to pass through the check valve 100 in the direction of arrow 106, but is also configured to prevent back flow of the fluid in the direction of arrow 108. As the fluid flows through the check valve 100, the state indication system 104 provides an indication of the operational state of the check valve 100.

Figure 2:
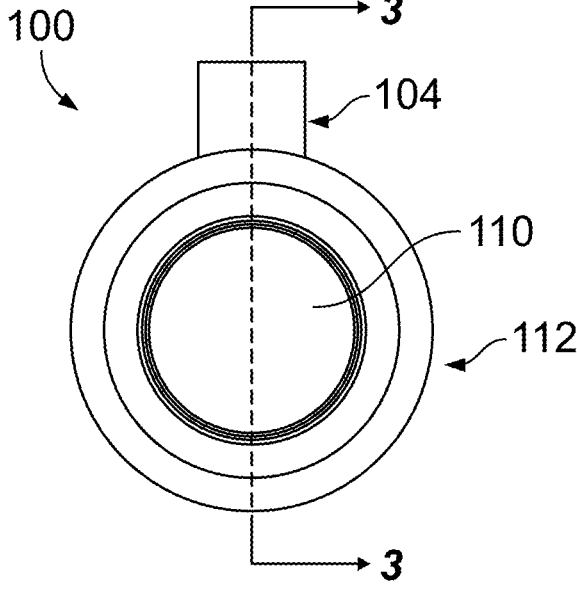
FIG. 2 illustrates a simplified top view of the check valve, according to an example of the present disclosure.

FIG. 2 illustrates a simplified top view of the check valve 100, according to an example of the present disclosure. The check valve 100 includes a poppet 110 retained within a housing 112. The state indication system 104 extends outwardly from the housing 112.

Figure 3:
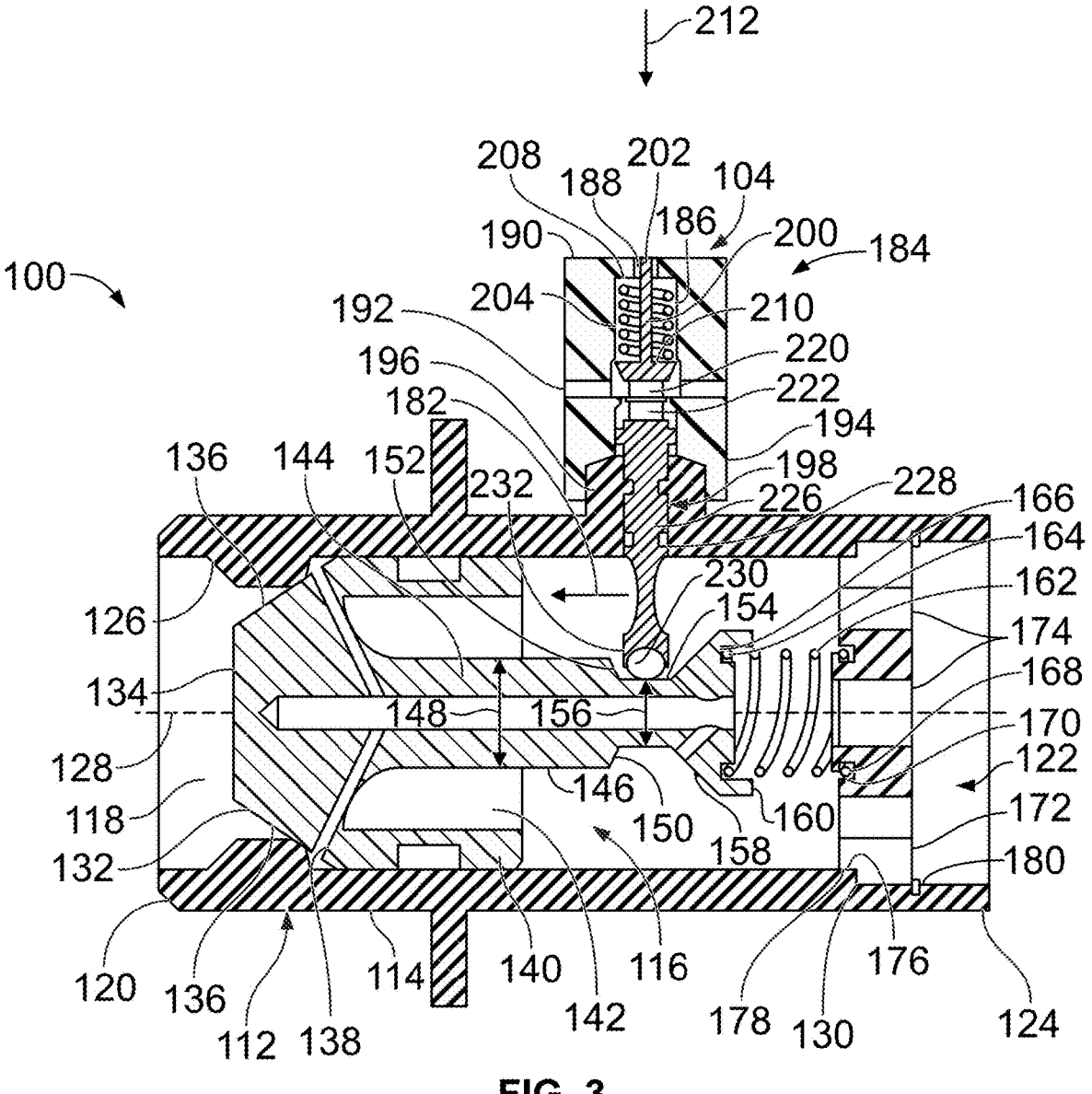
FIG. 3 illustrates a transverse cross-sectional view of the check valve in a first state through line 3-3 of FIG. 2, according to an example of the present disclosure.

FIG. 3 illustrates a transverse cross-sectional view of the check valve 100 in a first state through line 3-3 of FIG. 2, according to an example of the present disclosure. The housing 112 includes a main body 114, such as a tubular body, having a passage 116 formed therethrough. The passage 116 includes an inlet 118 at a first end 120, and an outlet 122 at a second end 124, which is opposite from the first end 120. The inlet 118 is in fluid communication with the outlet 122. A retaining ridge 126 inwardly extends toward a central longitudinal axis 128 proximate to the first end 120. In at least one example, the retaining ridge 126 has a sealing surface that abuts a poppet 132, thereby providing a sealing interface that eliminates, minimizes, or otherwise reduces back flow of fluid. A recessed channel 130 is recessed away from the central longitudinal axis 128 proximate to the second end 124.

The poppet 132 is retained within the passage 116. The poppet 132 includes a head 134 having angled surfaces 136 that abut against the retaining ridge 126. One or more fluid passages 138 are formed through the head 134. The head 134 connects to a collar 140 defining a central opening 142. A stem 144 extends from the head 134 through the central opening 142 of the collar 140. The stem 144 can be coaxial with the central longitudinal axis 128, and extends from the head 134 toward the second end 124.

The stem 144 includes a main shaft 146 having a diameter 148. The main shaft 146 connects to a cam surface 150 having downwardly angled walls 152, which connect to a groove 154 having a diameter 156, which is less than diameter 148. That is, the diameter 148 is greater than the diameter 156. Outer surfaces of the groove 154 can be parallel with outer surfaces of the main shaft 146. The groove 154 connects to outwardly angled ramp 158 of a spring-retaining foot 160.

A spring 162, such as a metal coil spring, has a first end 164 retained within a notch 166 of the spring-retaining foot 160, and a second end 168 (opposite from the first end 164) retained within a notch 170 of an end cap 172 having a plurality of openings 174. In at least one example, the end cap 172 is a metal screen or mesh. The end cap 172 includes a conforming channel 176 retained against a ridge 178 of the housing 112. Outer edges of the end cap 172 are securely sandwiched between the ridge 178 and a retaining clip 180. Optionally, the end cap 172 can be secured within a groove formed within the housing 112.

The spring 162 provides a spring force that biases the poppet 132 into a closed state, as shown in FIG. 3. For example, the spring 162 is compressed between the end cap 172 and the spring-retaining foot 160, thereby urging the head 134 in the direction of arrow 182 against the retaining ridge 126.

The state indication system 104 includes a body 184 including an internal passage 186 connected to an opening 188 at an exposed end 190. Optionally, the body 184 may not include the opening 188. A window 192 extends through the body 184 and can be perpendicular to the internal passage 186. A securing end 194 secures to a reciprocal member 196 of the housing 112. For example, the securing end 194 can include a threaded interface that threadably connects to the reciprocal member 196, which can be a threaded boss, for example. As another example, the body 184 can be welded to the boss.

A plunger 198 extends within the internal passage 186. The plunger 198 includes rod 200 that extends through the internal passage 186. The rod 200 can include an end 202 within the opening 188. A spring 204 (such as a coiled metal spring) is compressed within the internal passage 186 between a ceiling 208 proximate to the exposed end 190, and a ledge 210 of the plunger 198. The spring 204 biases the plunger downwardly toward the central longitudinal axis 128 in the direction of arrow 212.

The ledge 210 connects to a first indicator 220, which is disposed above a second indicator 222. The first indicator 220 can be a first band having a first color, such as red, while the second indicator 222 can be a second band having a second color, such as green. Optionally, different colors can be used. As another example, the first indicator 220 and the second indicator 222 can be bands made of different materials (such as different metals). For example, each different band can be a distinct metal with a distinct color, such as copper or brass. The bands can be chemically resistant to the fluid within the check valve 100, so as to prevent deterioration of the bands. As another example, the first indicator 220 can be a first graphic or text message, while the second indicator 222 can be a second graphic or text message. The first indicator 220 is associated with a first operational state, such as a closed state, of the check valve 100, while the second indicator 222 is associated with a second operational state, such as an open state, of the check valve 100. The window 192 allows either the first indicator 220 or the second indicator 222 to be viewed therethrough.

The plunger 198 further includes an extension shaft 226 that downwardly extends from the second indicator 222, through a passage 228 of the reciprocal member 196, and into the passage 116 of the housing 112. Outer surfaces of one or more portions of the extension shaft 226 sealingly engage internal surfaces of the reciprocal member 196. In at least one example, the plunger 198 and body 188 can have sealing surfaces that abut one another, thereby providing a sealing interface therebetween.

A bearing 230 is disposed at a distal end 232 of the extension shaft 226. In at least one example, the bearing 230 is a swaged ball bearing. As shown, the bearing 230 is biased into the groove 154 of the stem 144. The swaged ball bearing at the distal end 232 of the plunger 198 reduces reduce friction while rolling on the cam surface 150, which further isolates the plunger 198 from rotation, and improves actuation without sideloading the plunger 198.

In operation, when the poppet 132 is in a closed state, as shown in FIG. 3, the plunger 198 is biased such that the bearing 230 is biased into the groove 154 of the stem 144 between the cam surface 150 and the angled ramp 158. As such, the first indicator 220 is viewable through the window 192, thereby providing a readily discernable indication that the check valve 100 is in a first operational state, such as a closed state. The cam surface 150 translates longitudinal motion of the poppet 132 into motion of the plunger 198, or vice versa.

Figure 4:
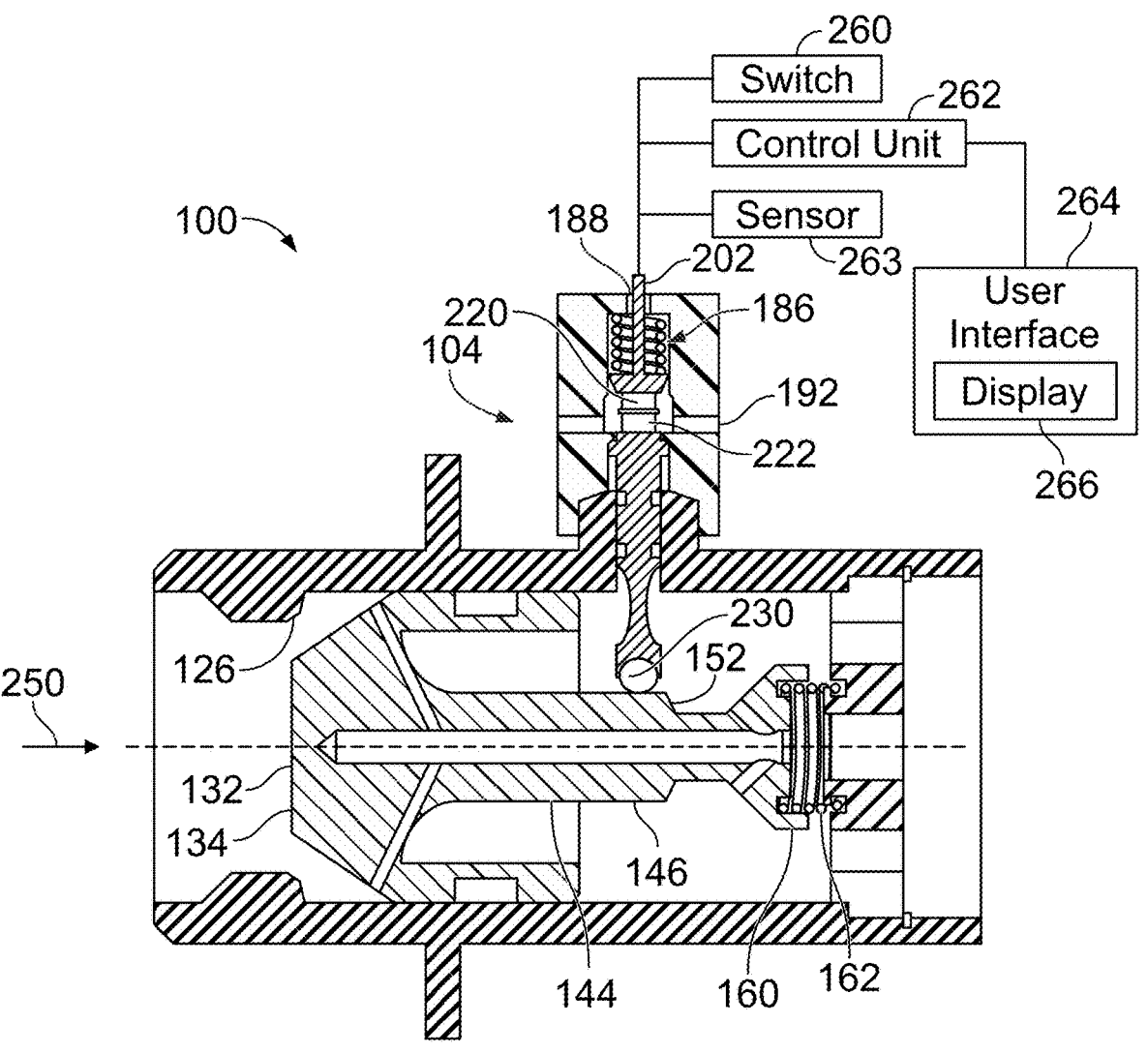
FIG. 4 illustrates a transverse cross-sectional view of the check valve in a second state through line 3-3 of FIG. 2, according to an example of the present disclosure.

FIG. 4 illustrates a transverse cross-sectional view of the check valve 100 in a second state through line 3-3 of FIG. 2, according to an example of the present disclosure. In at least one example, the second state is an open state, in which the head 134 of the poppet 132 separates (for example, unseats) from the retaining ridge 126. As such, the spring 162 is compressed between the end cap 172 and the spring-retaining foot 160. As the poppet 132 moves in the direction of arrow 250, the bearing 230 rides upwardly over the cam surface 150, and onto the main shaft 146 of the stem 144. During such motion, the plunger 198 is forced upwardly within the internal passage 186, which moves the second indicator 222 into the window 192. As such, the second indicator 222, which differs from the first indicator 220, is visible through the window 192, thereby providing a readily discernable indication that the check valve 100 in in the second operational state, which is an open state.

In at least one example, if the spring 162 degrades over time, the spring 162 may not be able to provide a resistive force into the poppet 132 such that the spring 162 remains compressed, and the poppet 132 remains undesirably in the open state. As such, the second indicator 222 being visible through the window 192 can provide an indication that the check valve 100 is malfunctioning.

In at least one example, the end 202 can extend outwardly through the opening 188 providing a secondary indication of the check valve 100 being in the second operational state. As another example, the plunger 198 may not include the first indicator 220, the second indicator 222, or the window 192, but may provide an indication of the first operational state by the end 202 being recessed withing the opening 188, and indication of the second operational state by the end 202 extending outwardly from the opening 188.

As another example, the state indication system 104 can be communicatively coupled with a switch 260, a control unit 262, and/or a sensor 263 (for example, a Hall effector sensor, an optical sensor, and/or the like). As an example, the end 202 can be connected to one or more of the switch 260, the control unit 262, and/or the sensor 263. The end 202 extending outwardly from the opening 188 can change a state of the switch to provide an electronic signal indicating a change of state. As another example, the end 202 can provide a signal to the control unit 262 of a changed state. The control unit 262 can then output a signal, such as to a user interface 264 having a display 266 (for example, an electronic monitor, television, touchscreen, or the like), indicating a change of state. For example, the user interface 264 can be a computer workstation, a handheld smart device, and/or the like, and which can be within a vehicle. The control unit 262 is configured to sense a state of the plunger 198 (such as by mechanical position, electromechanical sensing, and/or the like), and output a signal to the user interface 264 indicating the operational status of the check valve 100. The control unit 262 can show the operational state of the check valve 100 on the display 266. Optionally, the check valve 100 may not be in communication with a switch, a control unit, and/or a user interface.

Figure 5:
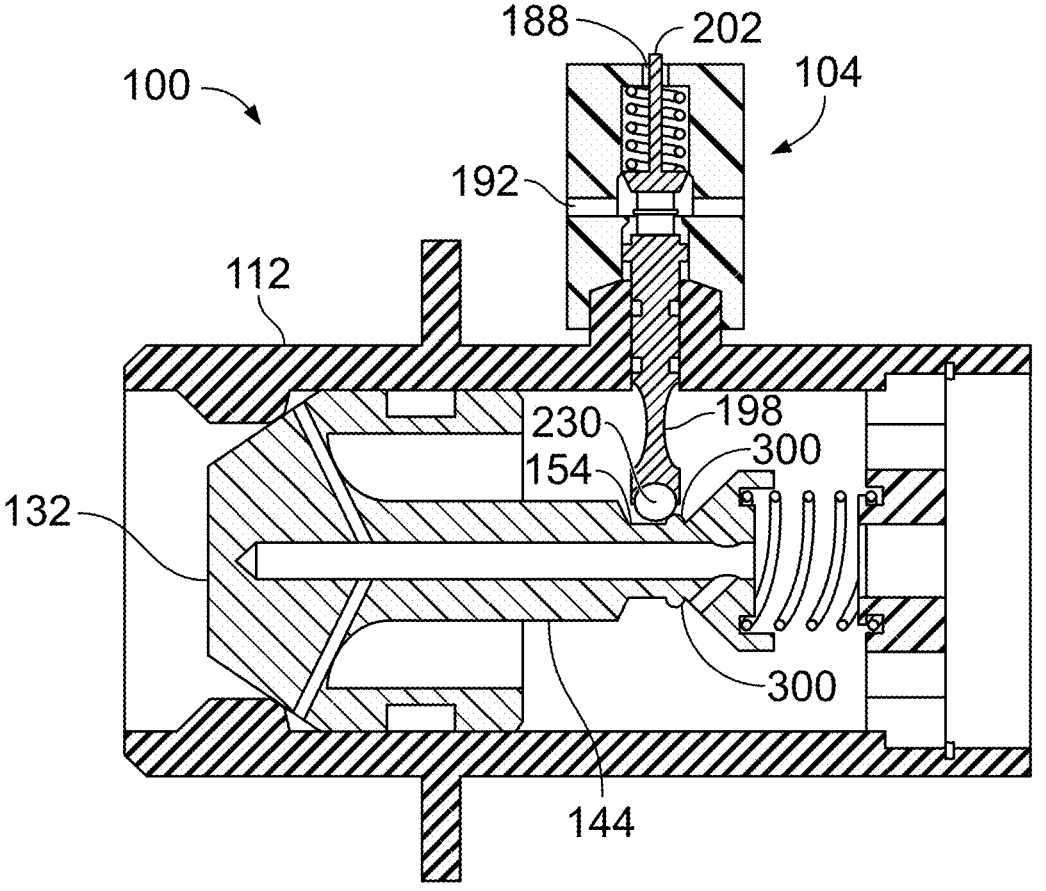
FIG. 5 illustrates a transverse cross-sectional view of the check valve in a first state through line 3-3 of FIG. 2, according to an example of the present disclosure.

FIG. 5 illustrates a transverse cross-sectional view of the check valve 100 in a first state through line 3-3 of FIG. 2, according to an example of the present disclosure. In this example, a protuberance 300 may outwardly extend from the stem within or other proximate to (such as next to) the groove 154. In at least one example, the protuberance 300 is a circumferential rim that has an increased diameter than that of the groove 154. The bearing 230 rests on the protuberance 300. As such, the end 202 may extend outwardly from the opening 188. The protuberance 300 allows for the check valve 100 to be tested to ensure proper operation.

Figure 6:
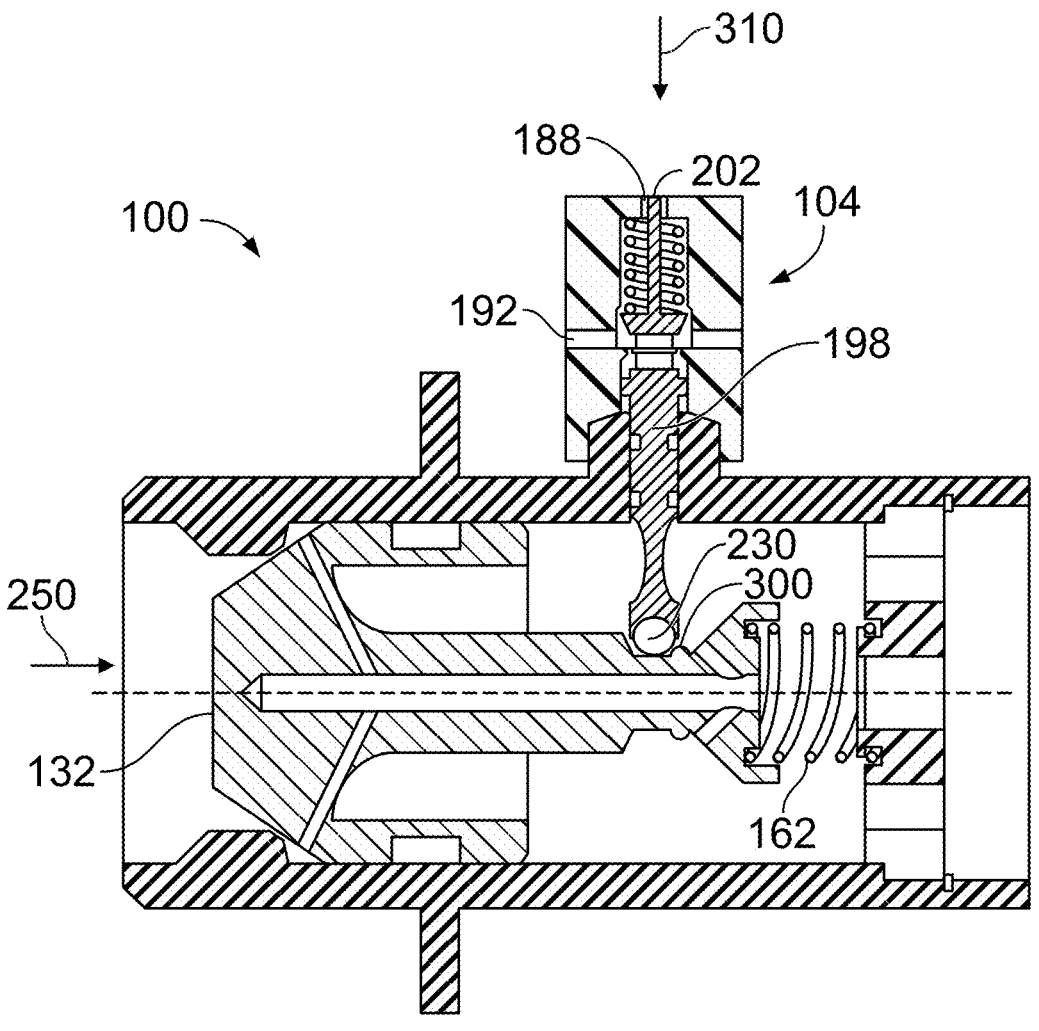
FIG. 6 illustrates a transverse cross-sectional view of the check valve in a second state through line 3-3 of FIG. 2, according to an example of the present disclosure.

FIG. 6 illustrates a transverse cross-sectional view of the check valve 100 in a second state through line 3-3 of FIG. 2, according to an example of the present disclosure. Referring to FIGS. 5 and 6, in order to test the check valve, the end 202 of the plunger 198 is pressed downwardly in the direction of arrow 310 into the opening 188. As such, the bearing 230 rides down the protuberance 300 into the groove 154, thereby slightly forcing the poppet 132 open in the direction of arrow 250. When pressure is released from the end 202, if the check valve 100 is properly functioning, the force of the spring 162 moves the poppet 132 back into the closed direction opposite from the direction of arrow 250, which, in turn, forces the end 202 to move outwardly from the opening 188 (and/or an associated indicator to be shown through the window 192). In this manner, an individual can readily determine that the spring 162 is properly functioning, and the check valve 100 is in a proper functioning state. If, however, the end 202 does not move outwardly from the opening 188 (and/or an associated indicator to be shown through the window 192) when pressure is released, an individual readily determines that the check valve 100 is not properly functioning.

Referring to FIGS. 1-6, examples of the present disclosure provide the check valve 100 including the state indication system 104, which includes the plunger 198 driven by motion of the poppet 132 to provide an indication of an operational state of the check valve 100. In at least one example, the state indication system 104 provides a readily discernable indication of any latent defects of the check valve 100 (such as a faulty spring 162). Examples of the present disclosure allow for vastly improved check valve health, monitoring, and maintenance The state indication system 104 can include additional plungers for redundancy and/or voting indications. The state indication system 104 can also include restrictor orifices to create a restrictor-check valve which indicates state.

As described herein, the check valve 100 includes the housing 112. The poppet 132 is retained within the housing 112. The state indication system 104 is operatively coupled to the poppet 132. The state indication system 104 is configured to provide an indication of a first operational state of the check valve 100, and a second operational state of the check valve 100. In at least one example, the first operational state is a closed state of the check valve 100, and the second operational state is an open state of the check valve 100.

Figure 7:
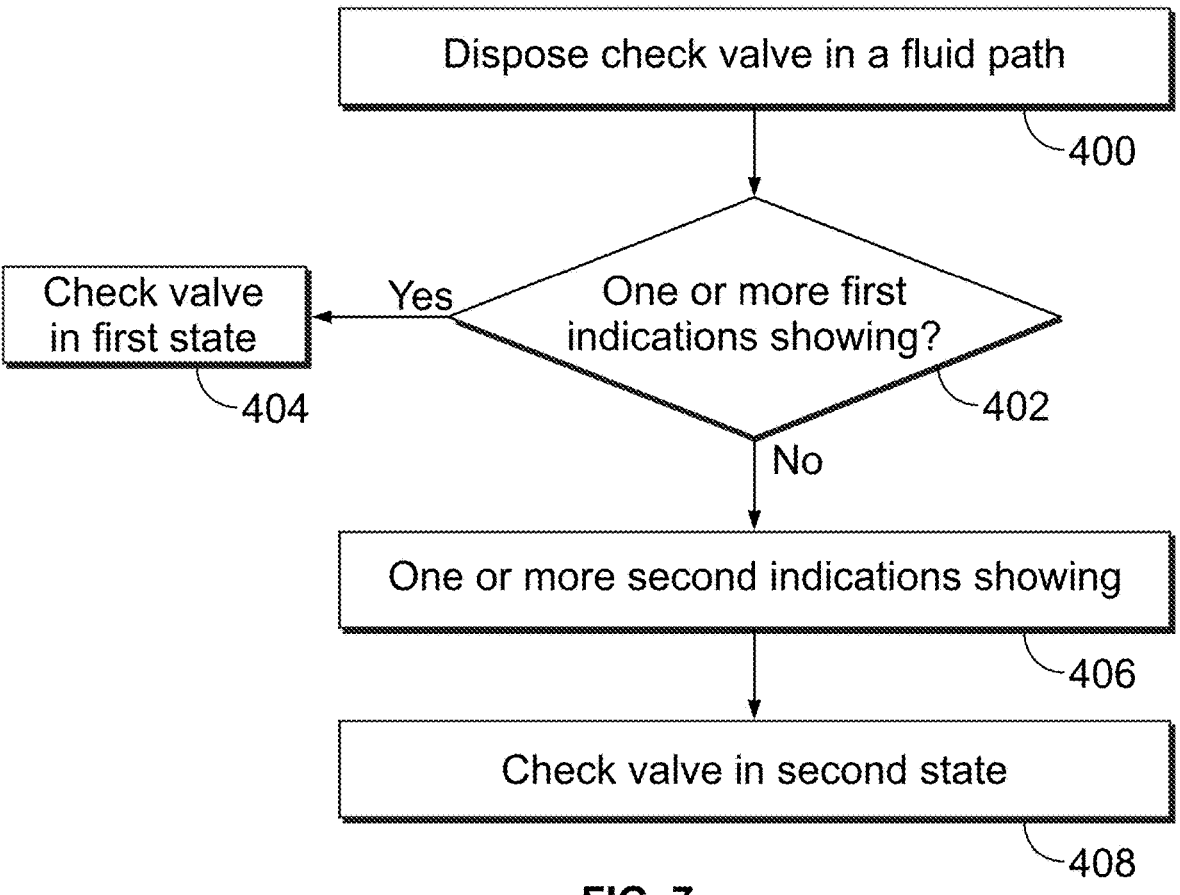
FIG. 7 illustrates a flow chart of a method, according to an example of the present disclosure.

FIG. 7 illustrates a flow chart of a method, according to an example of the present disclosure. Referring to FIGS. 1-7, at 400, the check valve 100 is disposed on the fluid path 102. At 402, it is determined if the state indication system 104 is showing one or more first indications (such as the first indicator 220 showing through the window 192, the end 202 of the plunger 198 being recessed into the opening 188 of the body 184, and/or the like). If so, the method proceeds to 404, at which an individual determines that the check valve 100 is in a first state, such as a closed state, a properly functioning state, and/or the like.

If, however, the state indication system 104 is not showing the one or more first indications, the method proceeds from 402 to 406, at which the state indication system 104 is showing one or more second indications (such as the second indicator 222 showing through the window 192, the end 202 of the plunger 198 extending upwardly out of the opening 188 of the body 184, and/or the like). The method then proceeds to 408, at which an individual determines that the check valve 100 is in a second state, such as an opening state, a malfunctioning state, and/or the like.

Figure 8:
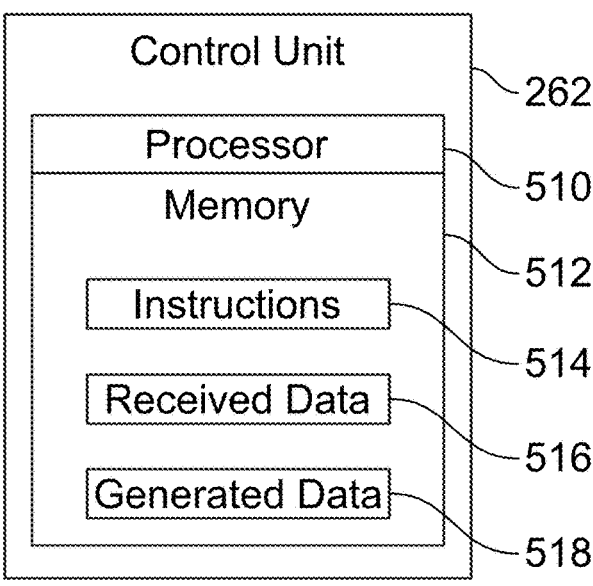
FIG. 8 illustrates a schematic block diagram of a control unit, according to an example of the present disclosure.

FIG. 8 illustrates a schematic block diagram of the control unit 262, according to an example of the present disclosure. In at least one example, the control unit 262 includes at least one processor 510 in communication with a memory 512. The memory 512 stores instructions 514, received data 516, and generated data 518. The control unit 262 shown in FIG. 8 is merely exemplary, and non-limiting.

As used herein, the term "control unit," "central processing unit," "CPU," "computer," or the like may include any processor-based or microprocessor-based system including systems using microcontrollers, reduced instruction set computers (RISC), application specific integrated circuits (ASICs), field programmable gate arrays (FPGAs), logic circuits, and any other circuit or processor including hardware, software, or a combination thereof capable of executing the functions described herein. Such are exemplary only, and are thus not intended to limit in any way the definition and/or meaning of such terms. For example, the control unit 262 may be or include one or more processors that are configured to control operation, as described herein.

The control unit 262 is configured to execute a set of instructions that are stored in one or more data storage units or elements (such as one or more memories), in order to process data. For example, the control unit 262 may include or be coupled to one or more memories. The data storage units may also store data or other information as desired or needed. The data storage units may be in the form of an information source or a physical memory element within a processing machine.

The set of instructions may include various commands that instruct the control unit 262 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 262. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 262 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Further, the disclosure comprises examples according to the following clauses:

Clause 1. A check valve configured to be disposed within a fluid path, the check valve comprising:
a housing;
a poppet retained within the housing; and
a state indication system operatively coupled to the poppet, wherein the state indication system is configured to provide an indication of a first operational state of the check valve, and a second operational state of the check valve.

Clause 2. The check valve of Clause 1, wherein the first operational state is a closed state of the check valve, and the second operational state is an open state of the check valve.

Clause 3. The check valve of Clauses 1 or 2, wherein the poppet is retained within a passage of the housing, and wherein the poppet comprises:
a head; and
a stem extending from the head, wherein the stem comprises a main shaft connected to a cam surface, wherein the cam surface connects to a groove.

Clause 4. The check valve of Clause 3, further comprising a spring connected to a spring-retaining foot of the poppet.

Clause 5. The check valve of Clause 4, further comprising an end cap, wherein the spring is disposed between the end cap and the spring-retaining foot.

Clause 6. The check valve of any of Clauses 3-5, wherein the state indication system comprises:
a body including a window;
a plunger biased into a portion of the poppet, wherein the plunger comprises:

one or more first indicators that indicate that the check valve is in the first state; and one or more second indicators that indicate that the check valve is in the second state.

Clause 7. The check valve of Clause 6, wherein the one or more first indicators show through the window to indicate that the check valve is in the first state, and wherein the one or more second indicators show through the window to indicate that the check valve is in the second state.

Clause 8. The check valve of Clauses 6 or 7, wherein the one or more first indicators comprise an end of the plunger one of recessed within or extending outwardly from the body, and wherein the one or more second indicators comprise the end of the plunger the other of recessed within or extending outwardly from the body.

Clause 9. The check valve of any of Clauses 6-8, wherein the one or more first indicators include a first color.

Clause 10. The check valve of Clause 9, wherein the one or more second indicators include a second color that differs from the first color.

Clause 11. The check valve of any of Clauses 6-10, wherein the plunger further comprises a bearing biased into the portion of the poppet.

Clause 12. The check valve of Clause 11, wherein the bearing is within the groove when the check valve is in the first state, and wherein the bearing is outside of the groove when the check valve is in the second state.

Clause 13. The check valve of any of Clauses 6-12, wherein the stem further comprises a protuberance proximate to the groove, wherein a portion of the plunger is biased into the protuberance when the check valve is in the first state, and wherein the plunger is configured to be pressed to move in relation to the protuberance to provide an indication that that the check valve is properly functioning.

Clause 14. The check valve of any of Clauses 1-13, wherein one or more of a switch, a control unit, or a sensor are in communication with the state indication system.

Clause 15. A method for a check valve disposed within a fluid path, the check valve comprising:

a housing;

a poppet retained within the housing; and a state indication system operatively coupled to the poppet, wherein the state indication system is configured to provide an indication of a first operational state of the check valve, and a second operational state of the check valve, the method comprising:

providing, by the state indication system, an indication of the first operational state of the check valve; and providing, by the state indication system, an indication of the second operational state of the check valve.

Clause 16. A system comprising:

a fluid path; and a check valve disposed within a fluid path, the check valve comprising:

a housing;

a poppet retained within a passage of the housing, wherein the poppet is retained within a passage of the housing, and wherein the poppet comprises a head, and a stem extending from the head, wherein the stem comprises a main shaft connected to a cam surface, wherein the cam surface connects to a groove;

a spring connected to a spring-retaining foot of the poppet;

an end cap, wherein the spring is disposed between the end cap and the spring-retaining foot; and a state indication system operatively coupled to the poppet, wherein the state indication system is configured to provide an indication of a first operational state of the check valve, and a second operational state of the check valve.

Clause 17. The system of Clause 16, wherein the first operational state is a closed state of the check valve, and the second operational state is an open state of the check valve.

Clause 18. The system of Clauses 16 or 17, wherein the state indication system comprises:

a body including a window;

a plunger biased into a portion of the poppet, wherein the plunger comprises:

one or more first indicators that indicate that the check valve is in the first state;

one or more second indicators that indicate that the check valve is in the second state; and a bearing biased into the portion of the poppet, wherein the bearing is within the groove when the check valve is in the first state, and wherein the bearing is outside of the groove when the check valve is in the second state.

Clause 19. The system of Clause 18, wherein the one or more first indicators show through the window to indicate that the check valve is in the first state, and wherein the one or more second indicators show through the window to indicate that the check valve is in the second state.

Clause 20. The system of any of Clauses 16-19, wherein the stem further comprises a protuberance proximate to the groove, and wherein the plunger is configured to be pressed to move in relation to the protuberance to provide an indication that that the check valve is properly functioning.

As described herein, examples of the present disclosure provide a check valve that allows an observer to determine an operational state of the check valve. Further, examples of the present disclosure provide a system and a method for providing a readily discernable indication of an operational state of a check valve.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the aspects of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A check valve configured to be disposed within a fluid path, the check valve comprising:
   a housing;
   a poppet retained within the housing, wherein the poppet is retained within a passage of the housing, and wherein the poppet comprises:
   a head; and
   a stem extending from the head, wherein the stem comprises a main shaft connected to a cam surface, wherein the cam surface connects to a groove; and
   a state indication system operatively coupled to the poppet, wherein the state indication system is configured to provide an indication of a first operational state of the check valve, and a second operational state of the check valve.

2. The check valve of claim 1, wherein the first operational state is a closed state of the check valve, and the second operational state is an open state of the check valve.

3. The check valve of claim 1, further comprising a spring connected to a spring-retaining foot of the poppet.

4. The check valve of claim 3, further comprising an end cap, wherein the spring is disposed between the end cap and the spring-retaining foot.

5. The check valve of claim 1, wherein the state indication system comprises:
   a body including a window;
   a plunger biased into a portion of the poppet, wherein the plunger comprises:
   one or more first indicators that indicate that the check valve is in the first state; and
   one or more second indicators that indicate that the check valve is in the second state.

6. The check valve of claim 5, wherein the one or more first indicators show through the window to indicate that the check valve is in the first state, and wherein the one or more second indicators show through the window to indicate that the check valve is in the second state.

7. The check valve of claim 5, wherein the one or more first indicators comprise an end of the plunger one of recessed within or extending outwardly from the body, and wherein the one or more second indicators comprise the end of the plunger the other of recessed within or extending outwardly from the body.

8. The check valve of claim 5, wherein the one or more first indicators include a first color.

9. The check valve of claim 8, wherein the one or more second indicators include a second color that differs from the first color.

10. The check valve of claim 5, wherein the plunger further comprises a bearing biased into the portion of the poppet.

11. The check valve of claim 10, wherein the bearing is within the groove when the check valve is in the first state, and wherein the bearing is outside of the groove when the check valve is in the second state.

12. The check valve of claim 5, wherein the stem further comprises a protuberance proximate to the groove, wherein a portion of the plunger is biased into the protuberance when the check valve is in the first state, and wherein the plunger is configured to be pressed to move in relation to the protuberance to provide an indication that that the check valve is properly functioning.

13. The check valve of claim 1, wherein one or more of a switch, a control unit, or a sensor are in communication with the state indication system.

14. A system comprising:
   a fluid path; and
   a check valve disposed within a fluid path, the check valve comprising:
   a housing;
   a poppet retained within a passage of the housing, wherein the poppet is retained within a passage of the housing, and wherein the poppet comprises a head, and a stem extending from the head, wherein the stem comprises a main shaft connected to a cam surface, wherein the cam surface connects to a groove;
   a spring connected to a spring-retaining foot of the poppet;
   an end cap, wherein the spring is disposed between the end cap and the spring-retaining foot; and
   a state indication system operatively coupled to the poppet, wherein the state indication system is configured to provide an indication of a first operational state of the check valve, and a second operational state of the check valve.

15. The system of claim 14, wherein the first operational state is a closed state of the check valve, and the second operational state is an open state of the check valve.

16. The system of claim 14, wherein the state indication system comprises:
   a body including a window;
   a plunger biased into a portion of the poppet, wherein the plunger comprises:
   one or more first indicators that indicate that the check valve is in the first state;
   one or more second indicators that indicate that the check valve is in the second state; and a bearing biased into the portion of the poppet, wherein the bearing is within the groove when the check valve is in the first state, and wherein the bearing is outside of the groove when the check valve is in the second state.

17. The system of claim 16, wherein the one or more first indicators show through the window to indicate that the check valve is in the first state, and wherein the one or more second indicators show through the window to indicate that the check valve is in the second state.

18. The system of claim 14, wherein the stem further comprises a protuberance proximate to the groove, and wherein the plunger is configured to be pressed to move in relation to the protuberance to provide an indication that that the check valve is properly functioning.

19. A check valve configured to be disposed within a fluid path, the check valve comprising:

a housing;

a poppet retained within the housing; and a state indication system operatively coupled to the poppet, wherein the state indication system is configured to provide an indication of a first operational state of the check valve, and a second operational state of the check valve, wherein one or more of a switch, a control unit, or a sensor are in communication with the state indication system.

20. The check valve of claim 19, wherein the switch, the control unit, and the sensor are in communication with the state indication system.

* * * * *